US010389580B2

(12) United States Patent
Tang et al.

(10) Patent No.: US 10,389,580 B2
(45) Date of Patent: Aug. 20, 2019

(54) DISTRIBUTED COMPUTING SYSTEM CONFIGURATION

(71) Applicant: HGST Netherlands B.V., Amsterdam (NL)

(72) Inventors: Nina Tang, Saratoga, CA (US); Ruben De Zaeytijd, Kluisbergen (BE); Carl Rene D'Halluin, Melle (BE)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/337,925

(22) Filed: Oct. 28, 2016

(65) Prior Publication Data

US 2018/0123876 A1    May 3, 2018

(51) Int. Cl.
*H04L 12/24* (2006.01)
*H04L 12/26* (2006.01)
*H04L 29/08* (2006.01)

(52) U.S. Cl.
CPC ...... *H04L 41/0803* (2013.01); *H04L 41/0266* (2013.01); *H04L 41/0806* (2013.01);
(Continued)

(58) Field of Classification Search
CPC ............. H05K 7/1492; H05K 7/20836; H05K 7/1498; G06F 1/3206; G06F 1/3287;
(Continued)

(56) References Cited

U.S. PATENT DOCUMENTS 6,345,294 B1     2/2002   O'Toole et al.
8,910,156 B1 *  12/2014   Kenchammana-Hosekote ............
                                                 G06F 9/45533
                                                          718/1
(Continued)

FOREIGN PATENT DOCUMENTS

EP     1009130 A1    6/2000
EP     2728470 A1    5/2014

OTHER PUBLICATIONS

International Search Report and Written Opinion, PCT/IB2017/001133, dated Dec. 12, 2017 (15 pages).
(Continued)

*Primary Examiner* — Ranodhi Serrao
*Assistant Examiner* — James N Fiorillo
(74) *Attorney, Agent, or Firm* — Patent Law Works LLP

(57) ABSTRACT

A single-geo system includes a network configuration generator and a first computing system rack, or a multi-geo system includes a network configuration generator, a first computing system rack, and a second computing system rack are described. The system receives network information for a first plurality of nodes and a second plurality of nodes, and generates a system-wide network configuration file including network configuration information for the first plurality of nodes and the second plurality of nodes. Each plurality of nodes includes a controller node to receive the system-wide network configuration file, identify network configuration information for this plurality of nodes in the system-wide network configuration file as being part of the
(Continued)

computing system rack, and update network configuration for this plurality of nodes based on the identified network configuration information for the computing system rack.

20 Claims, 11 Drawing Sheets

(52) U.S. Cl.
CPC ........... *H04L 41/22* (2013.01); *H04L 43/0811* (2013.01); *H04L 67/10* (2013.01); *H04L 67/34* (2013.01)

(58) Field of Classification Search
CPC ............. H04L 67/1008; H04L 41/0803; H04L 41/0843; H04L 41/0853; H04L 41/0893
USPC .................................................. 709/220, 221
See application file for complete search history.

(56) References Cited

U.S. PATENT DOCUMENTS

| | | | |
|---|---|---|---|
| 9,430,262 B1* | 8/2016 | Felstaine | G06F 9/45558 |
| 9,641,394 B2* | 5/2017 | Jubran | H04L 41/12 |
| 9,697,172 B1* | 7/2017 | Somohano | H04L 45/02 |
| 2003/0208656 A1* | 11/2003 | Hawkins | G06F 11/0751 |
| | | | 711/103 |
| 2004/0249904 A1 | 12/2004 | Moore et al. | |
| 2006/0168196 A1* | 7/2006 | Herbert | G06F 8/61 |
| | | | 709/224 |
| 2006/0271647 A1* | 11/2006 | Tindall | H04L 41/0843 |
| | | | 709/220 |
| 2008/0082809 A1* | 4/2008 | Rothman | G06F 9/4416 |
| | | | 713/1 |
| 2009/0319650 A1* | 12/2009 | Collins | G06F 1/206 |
| | | | 709/223 |
| 2010/0138642 A1* | 6/2010 | Cherian | G06F 9/4401 |
| | | | 713/2 |
| 2011/0158088 A1 | 6/2011 | Lofstrand et al. | |
| 2012/0311111 A1* | 12/2012 | Frew | G06F 9/5072 |
| | | | 709/221 |
| 2013/0198346 A1* | 8/2013 | Jubran | H04L 41/12 |
| | | | 709/220 |
| 2013/0227558 A1 | 8/2013 | Du et al. | |
| 2014/0047084 A1* | 2/2014 | Breternitz | H04L 67/1008 |
| | | | 709/221 |
| 2014/0064283 A1* | 3/2014 | Balus | H04L 49/70 |
| | | | 370/392 |
| 2014/0173060 A1* | 6/2014 | Jubran | G06F 9/5061 |
| | | | 709/220 |
| 2015/0052228 A1* | 2/2015 | Rousseau | G06F 15/177 |
| | | | 709/220 |
| 2015/0312802 A1* | 10/2015 | Shah | H04W 24/02 |
| | | | 370/235 |
| 2016/0014073 A1* | 1/2016 | Reddy | H04L 67/38 |
| | | | 713/2 |
| 2016/0142375 A1 | 5/2016 | Tubi et al. | |
| 2016/0253244 A1* | 9/2016 | Zhang | G06F 11/1415 |
| | | | 707/645 |
| 2016/0291999 A1 | 10/2016 | Antony et al. | |
| 2017/0054603 A1* | 2/2017 | Kulkarni | H04L 41/0893 |
| 2017/0126505 A1* | 5/2017 | Cencini | H04L 67/22 |
| 2017/0149880 A1* | 5/2017 | Lochhead | G06F 9/00 |
| 2017/0264493 A1* | 9/2017 | Cencini | H04L 41/044 |
| 2017/0371756 A1* | 12/2017 | Hanson | G06F 11/2289 |
| 2018/0034769 A1* | 2/2018 | Modi | H04L 45/122 |

OTHER PUBLICATIONS

Zeldner, "Server Networks: Software Integration Tools for CIM," Computer Integrated Manufacturing, International Conference on. IEEE, 1988 (10 pages).

Aumage, et al., "MPICH/MADIII: a Cluster of Clusters-Enabled MPI Implementation," Third IEEE International Symposium on Cluster Computing and the Grid, Dec. 2008 (8 pages).

Yoon et al., "A Modeling Component for SSF based Network Simulation Package," Signal Processing and Communication Systems, 2nd International Conference on IEEE, 2008 (6 pages).

Gilaberte, et al., "Self-configuraiton of spontaneous networks by context-aware mechanisms," Networking and Services, Fifth International Conference on IEEE, 2009 (6 pages).

Richling, et al., "Operating two InfiniBand grid clusters over 28 km distance," International Journal of Grid and Utility Computing, 2010 (8 pages).

* cited by examiner

DISTRIBUTED COMPUTING SYSTEM CONFIGURATION

BACKGROUND

The present disclosure generally relates to computer configuration systems. In a more particular example, the present disclosure relates to configuring distributed computing systems.

Object storage is a data storage model that manages information as objects. An object generally includes the payload data of the object, a variable quantity of meta-information, and a globally distinguishable key to reference the object. Sometimes object storage is implemented on a cloud storage system, where data is stored in logical buckets while the underlying physical storage spans multiple servers located in different geographic locations.

Cloud storage may be provided to others as a public service by a hosting company or may be a private service provided internally by an organization. In either implementation, it generally requires significant resources and expertise to configure and bring such a system online given the number of devices and the distributed nature of the system. For instance, in a multi-site implementation, configuration of the numerous underlying servers and constituent devices forming the system must generally be coordinated between separate human resources at each site managing that site's devices, often leading to delays, configuration errors, and other issues.

SUMMARY

The present disclosure generally relates to computer configuration systems. According to one innovative aspect of the subject matter in this disclosure, a system includes a network configuration generator, a first computing system rack, and a second computing system rack. While described as a first computing system rack and a second computing system rack, it should be noted that multiple computing system racks, such as three computing system racks, are envisioned in this disclosure. The network configuration generator is configured to: receive network configuration information for a first plurality of nodes and a second plurality of nodes, and generate a system-wide network configuration file including network configuration information for the first plurality of nodes and the second plurality of nodes. The first computing system rack includes the first plurality of nodes communicatively connected together. The first plurality of nodes includes a first controller node configured to: receive the system-wide network configuration file, identify network configuration information for the first plurality of nodes in the system-wide network configuration file as being part of the first computing system rack, and update network configuration for the first plurality of nodes based on the identified network configuration information for the first computing system rack. The second computing system rack includes the second plurality of nodes communicatively connected together. The second plurality of nodes includes a second controller node configured to: receive the system-wide network configuration file, identify network configuration information for the second plurality of nodes in the system-wide network configuration file as being part of the second computing system rack, and update network configuration for the second plurality of nodes based on the identified network configuration information for the second computing system rack.

In general, another innovative aspect of the subject matter described in this disclosure may be implemented in methods that include: receiving network configuration information for a first plurality of nodes and a second plurality of nodes; generating a system-wide network configuration file including network configuration information for the first plurality of nodes and the second plurality of nodes; uploading the system-wide network configuration file to a first controller node and a second controller node, the first plurality of nodes communicatively connected together in a first computing system rack, the second plurality of nodes communicatively connected together in a second computing system rack, the first plurality of nodes includes the first controller node and the second plurality of nodes includes the second controller node; identifying network configuration information for the first plurality of nodes in the system-wide network configuration file as being part of the first computing system rack; updating network configuration for the first plurality of nodes based on the identified network configuration information for the first computing system rack; identifying network configuration information for the second plurality of nodes in the system-wide network configuration file as being part of the second computing system rack; and updating network configuration for the second plurality of nodes based on the identified network configuration information for the second computing system rack.

Other implementations of one or more of these aspects include corresponding systems, apparatus, and computer programs, configured to perform the actions of the methods, encoded on computer storage devices.

These and other implementations may each optionally include one or more of the following features. For instance, features include where the first plurality of nodes and the second plurality of nodes are linked to an intermediate network; updating network configuration for the second plurality of nodes includes configuring a public Layer-3 network address for a publically accessible node; receiving network configuration information and generating a system-wide network configuration file is performed through a browser-accessible application served from the first controller node; the system-wide network configuration file includes Layer-3 network configuration information for the first plurality of nodes and the second plurality of nodes; the first plurality of nodes and the second plurality of nodes form part of a distributed object storage service with a storage application programming interface (API) served from a first gateway node; and the first plurality of nodes and a second gateway node within the second plurality of nodes.

For instance, the operations further include: determining when a second computing system rack has been properly network configured and is communicatively accessible over the intermediate network, and identifying a distributed computing system comprising the first plurality of nodes and the second plurality of nodes as being network configured based on the determination that the second computing system rack has been properly network configured and is communicatively accessible over the intermediate network. For instance, the operations further include: polling connectivity status to the publically accessible node periodically until connectivity is established; and querying the publically accessible node regarding whether the second plurality of nodes have been properly network configured. For instance, the operations further include: authenticating a user to the system, receiving confirmation of acceptance of a license agreement from the user, receiving a set of distributed object storage configuration information for a distributed object storage service, applying the set of distributed object storage configuration information to the first plurality of nodes and the second plurality of nodes, and activating live use of the distributed object storage service by enabling accessibility of the first gateway node and the second gateway node.

These implementations are particularly advantageous in a number of respects. For instance, the technology described herein provides a mechanism to quickly and accurately bring a large multi-site distributed computing system online.

It should be understood that language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation, in the figures of the accompanying drawings in which like reference numerals are used to refer to similar elements.

DETAILED DESCRIPTION

Figure 1:
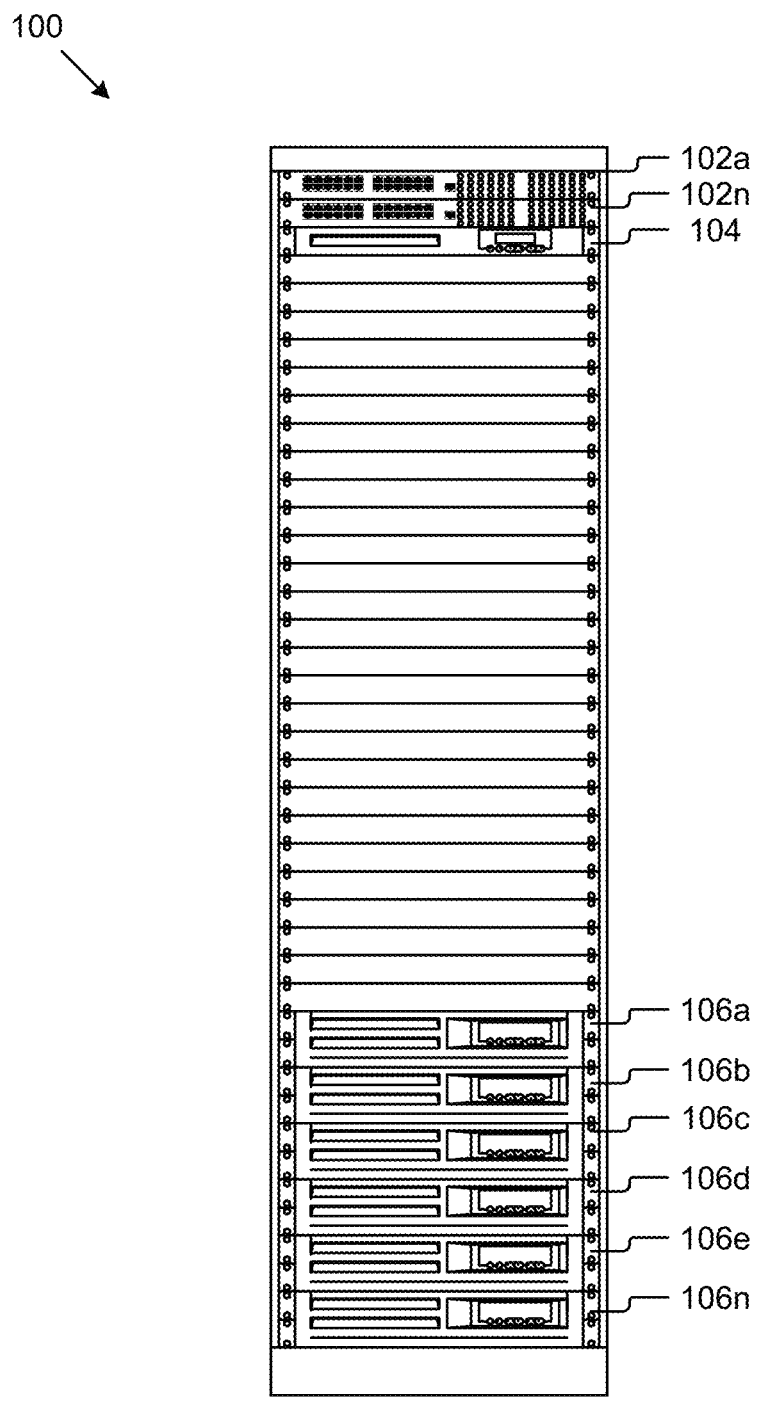
FIG. 1 is a schematic illustration of an example computing system rack.

FIG. 1 is a schematic illustration of an example computing system rack 100. The computing system rack 100 may include a plurality of nodes. The nodes may be the same type or different types. As depicted, the example computing system rack 100 includes one or more switches 102a-n, one or more controller nodes 104, and one or more storage nodes 106a-n. It should be recognized that FIG. 1 as well as the other figures used to illustrate an embodiment, and an indication of a letter after a reference number or numeral, for example, "102a" is a specific reference to the element or component that is designated by that particular reference numeral. In the event a reference numeral appears in the text without a letter following it, for example, "102," it should be recognized that such is a general reference to different embodiments of the element or component bearing that general reference numeral. In some cases, a single computing system rack such as that illustrated in FIG. 1, may be referred to herein as a single geo-system, and as the phrase implies, may be geographically located in a single place. Likewise, in some cases multiple computing system racks such as that illustrated and described with reference to FIG. 3 below, may be referred to herein as a multi-geo system, and as the phrase implies, may be geographically located in various places.

The switch 102 may be an Ethernet switch such as a Layer-2 switch conforming to the Institute of Electrical and Electronics Engineers' (IEEE) 802.3an-2006 10GBASE-T standard (10 GbE), although other types of switches are also possible and contemplated. In some implementations, various networking hubs, routers, bridges, and/or other network devices may be additionally or alternatively used to communicatively connect the controller node 104 together with each of the storage nodes 106. In some cases, the switch 102 may have integrated Layer-3 routing capabilities. In further cases, a Layer-3 router may be added to the computing system rack 100 or located nearby in an adjacent rack and communicatively connected to the switch 102. The computing system rack 100 may also include further specialized networking devices not depicted in the computing system rack 100 such as a virtual private networking (VPN) endpoint, a firewall, etc. These specialized networking devices have been omitted from FIG. 1 for simplicity in describing the subject matter disclosed herein, but are nevertheless contemplated as forming a part of the computing system rack 100 in some implementations.

The controller node 104 may have data processing, non-transitory storage, and communication capabilities. In some embodiments, the controller node 104 may include a server computer with one or more processors, random access memory (RAM), and networking capabilities. For example, in the year 2016, the controller node 104 may include dual Intel Xeon® E5-2640 v3 8-core processors, 128 gigabytes (GBs) of double data rate fourth-generation (DDR4) synchronous dynamic random-access memory (DRAM), and dual 10 GbE network interface cards (NICs), although other configurations are also applicable. While in some cases the controller node 104 may implement some of the functionality of the storage nodes 106 as discussed below, the controller node 104 may also implement some specialized functionality within the computing system rack 100. For example, the controller node 104 may implement a cloud service application programming interface (API); site coordination in a multi-site computing system; and/or coordinate cloud services by controlling the storage nodes 106. For instance, the controller node 104 may receive a storage request through an API hosted on the controller node 104. The controller node 104 may functionally route the storage request to a storage device located in one of the storage nodes 106 for storage. The controller node 104 may index the storage location within the specific storage node 106. In a multi-site computing system, the controller node 104 may duplicate the storage request and functionally route the storage request to a computing system located at another site for redundancy. The controller node 104 may also analyze data to determine which site(s) within a multi-site computing system would be more effective in responding to reads and/or writes of storage users.

The storage node 106 may have data processing, non-transitory storage, and communication capabilities. In some embodiments, the storage node 106 may include a server computer with one or more processors, RAM, networking capabilities, and storage capabilities. For example, in the year 2016, the storage node 106 may include an Intel Xeon® D-1540 8-core processor, 128 GBs of double data rate third-generation (DDR3) DRAM, and dual 10 GbE NICs, and 12 serial attached small computer system interface (SCSI (SAS)) hard disk drives (HDDs) with a capacity of 8 terabytes (TBs) each for a total of 96 TBs per storage node 106, although other configurations are also applicable. As a further example, there may be 6 storage nodes 106a-n for a rack storage capacity of 576 TBs of raw storage.

Figure 2:
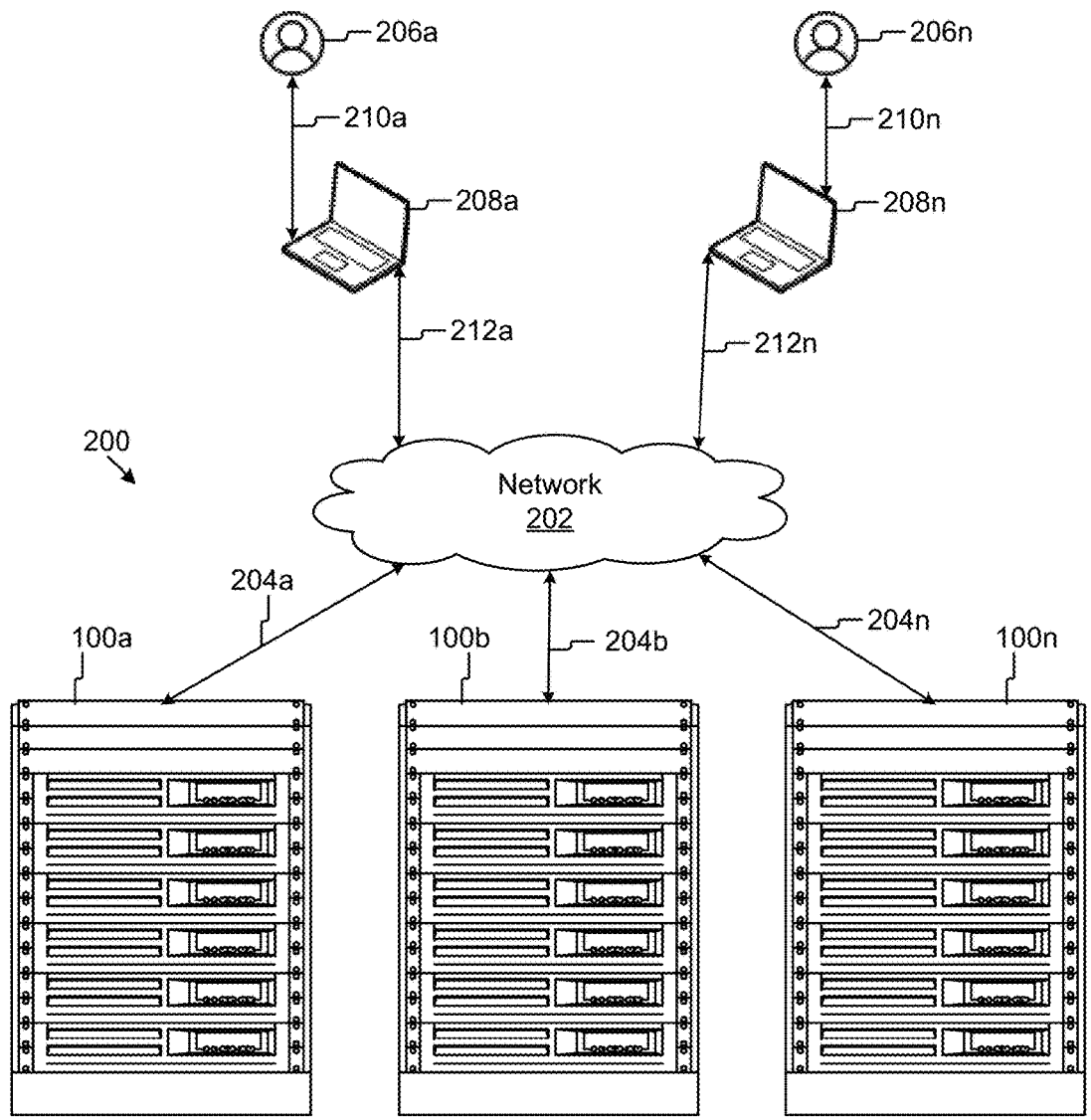
FIG. 2 is a schematic illustration of example computing system racks connected over a network.

FIG. 2 is a schematic illustration of example computing system racks 100a-n connected over a network 202 to form a distributed computing system 200. The network 202 may be a conventional type, wired or wireless, and may have numerous different configurations including a star configuration, token ring configuration, or further configurations. The network 202 may include a wide area network (WAN) (e.g., the Internet), a local area network (LAN), a virtual private network (VPN), and/or further interconnected data paths across which multiple devices may communicate. In some instances, the network 202 may be a peer-to-peer network. The network 202 may also be coupled to or include portions of a telecommunications network for sending data in a variety of different communication protocols. The computing system racks 100a-n may be communicatively connected over signal lines 204a-n respectively to the network 202. The computing systems 208a-n may be communicatively connected over signal lines 212a-n respectively to the network 202. The users 206a-n may interact with the computing systems 208a-n (also simply referred to as 208) as indicated by the lines 210a-n, respectively. For example, the user 206 may use an object storage system hosted across the distributed computing system 200 by interacting with the computing system 208.

In some embodiments, the computing systems 208 are client devices that include non-transitory memor(ies), processor(s), and communication unit(s), and other components that are communicatively coupled via a communications bus. The computing system 208 may couple to the network 202 and can send and receive data to and from other system 200 entities. Non-limiting examples of a computing system 208 include a laptop computer, a desktop computer, a tablet computer, a mobile telephone, a personal digital assistant (PDA), a mobile email device, a wearable device, an embedded computing device, or any other electronic device capable of processing information and accessing a network 202.

In some embodiments, the computing system 208 may include an instance of a user interface 314, which executes instructions configured to receive, process, and present information, send information to other system 200 entities, provide the information, function, and acts discussed herein, etc. Although FIG. 2 illustrates two computing systems 208, the system 200 can include any number of computing systems 208.

In connecting the computing system racks 100a-n over a network 202 to form a distributed computing system 200, the distributed computing system 200 may provide increased functional performance, redundancy, and reliability to users. For instance, one or more of the computing system racks 100 may provide an application programming interface to cloud services provided by the system 200. A domain name system (DNS) may provide geographic or round-robin load balancing for the API by resolving user domain name requests to one of the computing system racks 100 in the distributed computing system 200. In some cases, while each of the computing system racks 100 may separately implement the API, the distributed computing system 200 may present a common API through a shared domain name. Furthermore, the computing systems 100 may be functionally coordinated such that if a request is made to a controller node on a first computing system rack 100a, and physical processing is required on a storage node in a second computing system rack 100b, the controller node is capable of functionally routing the request appropriately to handle the request. For example, a request for retrieval of a storage item may be made from the controller node on a first computing system rack 100a, but the storage item may be physically stored in a second computing system rack 100b. The controller node may have a dynamic translation table to translate logical storage addresses such as a storage key to physical addresses (e.g., a controller node's Internet Protocol (IP) address, etc.). In some cases, a stored item may be physically stored on more than one controller node, and the controller nodes may be located at different sites.

Given the complex nature of the distributed computing system 200 in some embodiments, the configuration of the distributed computing system 200 may be overwhelmingly time-intensive and prone to error. For example, each network interface card (NIC) in the example computing system racks 100 may require proper configuration, and the computing system racks 100 may require proper network configuration to communicate across the network 202. In some embodiments, intelligent platform management interface (IPMI) addresses are assigned as part of the network configuration. As contemplated according to the techniques described herein, a bring-up application 300 (described with reference to FIG. 3 below and the accompanying diagrams following FIG. 3) can advantageously improve configuration speed and reduce the number of potential errors that can occur in configuring the distributed computing system 200. For instance, the techniques described herein allow for the distributed computing system 200 to go functionally live in a shorter period of time using technicians with less information system (IT) training. Also, the techniques described herein allow manufacturers of distributed computing systems to market the ease and rapidness of bringing such a complex system to productivity in an organization.

Figure 3:
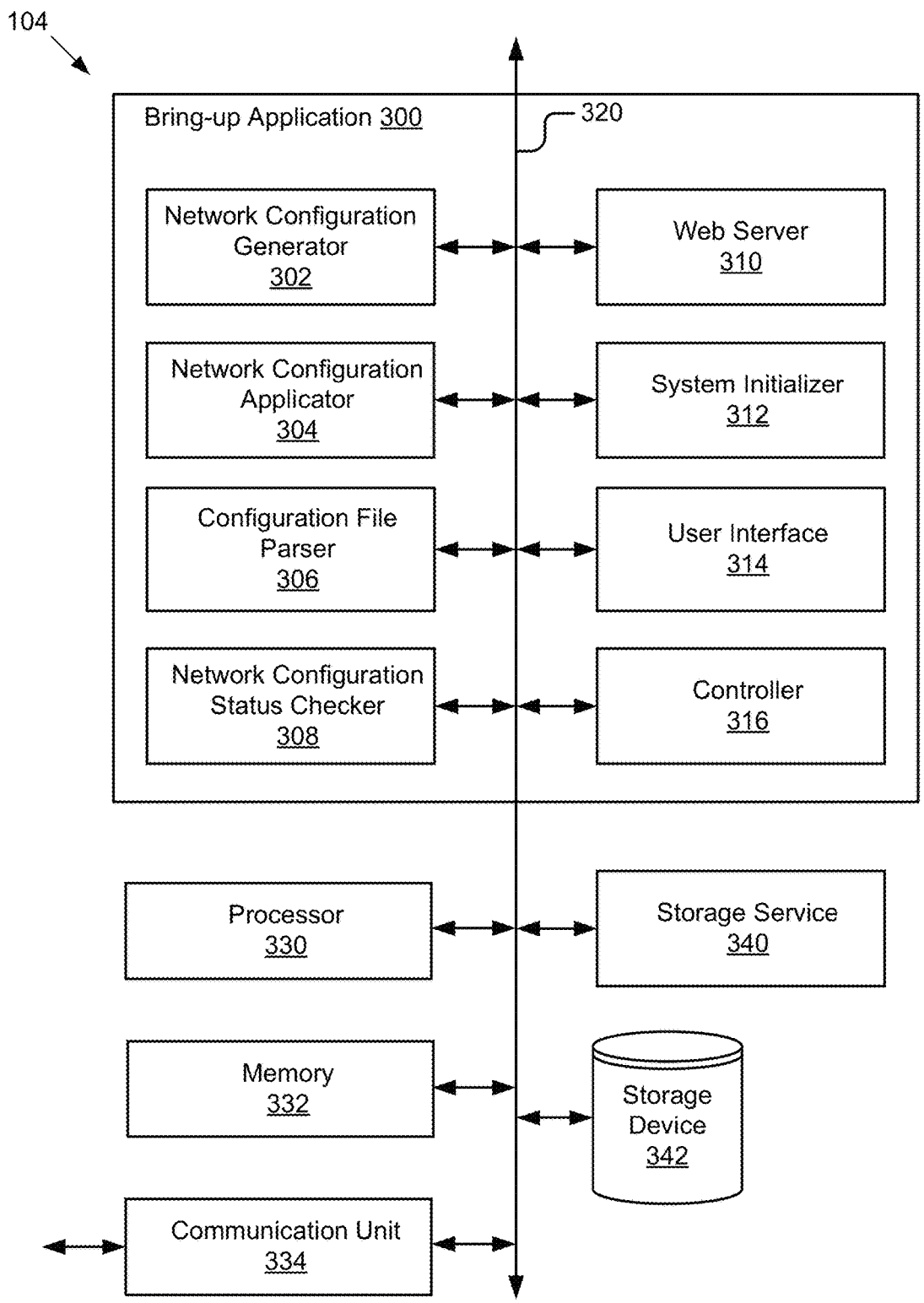
FIG. 3 is a block diagram of an example controller node.

FIG. 3 is a block diagram of an example controller node 104 with a bring-up application 300. While the bring-up application 300 is shown as being a part of a controller node 104, it is appreciated that the acts and/or functionality described with respect to the controller node 104 may be embodied in other servers or systems within the distributed computing system 200. Also note that while the term "controller node" is used to refer to item 104, particularly in describing FIG. 3, in other parts of the present patent application, item 104 may alternatively be referred to as "configuration node", "gateway node", "scalar node", or simply "computing device". While the functionality of these various terms may be split amongst several servers, for simplicity the functionality is often combined into a single server and thus is illustrated as such in this description.

The controller node 104 may include a bring-up application 300, a processor 330, a memory 332, a communication unit 334, a storage service 340, and a storage device 342. The components of the computing device 104 are communicatively coupled by a bus 320.

The processor 330 includes an arithmetic logic unit, a microprocessor and general purpose controller, or some other processor array to perform computations and provide electronic display signals to a display device. The processor 330 is coupled to the bus 320 for communication with the other components. Processor 330 processes data signals and may include various computing architectures including a complex instruction set computer (CISC) architecture, a reduced instruction set computer (RISC) architecture, or an architecture implementing a combination of instruction sets. Although FIG. 3 includes a single processor 330, multiple processors 330 may be included. Further processors, operating systems, sensors, displays and physical configurations are possible.

The memory 332 includes one or more non-transitory computer readable media. The memory 332 stores instructions and/or data that may be executed by the processor 330. The memory 332 is coupled to the bus 320 for communication with the other components. The instructions and/or data may include code for performing the techniques described herein. The memory 332 may be a dynamic random access memory (DRAM) device, a static random access memory (SRAM) device, flash memory, or some other memory device. In some instances, the memory 332 also includes a non-volatile memory or similar permanent storage device and media including a hard disk drive, a floppy disk drive, a compact disc read-only memory (CD-ROM) device, a digital versatile disc read-only memory (DVD-ROM) device, a digital versatile disc random-access memory (DVD-RAM) device, a digital versatile disc rewritable (DVD RW) device, a flash memory device, or some other mass storage device for storing information on a more permanent basis.

The communication unit 334 transmits and receives data to and from the network 202. The communication unit 334 is coupled to the bus 320. In some instances, the communication unit 334 includes a port for direct physical connection to the network 202 or to another communication channel. For example, the communication unit 334 includes a universal serial bus (USB), secure digital (SD), category-6 (CAT-6) or similar port for wired communication with the network 202. In some instances, the communication unit 334 includes a wireless transceiver for exchanging data with the network 202 or other communication channels using one or more wireless communication methods, including institute of electrical and electronics engineers (IEEE) 802.11, IEEE 802.16, BLUETOOTH® or another suitable wireless communication method. Although FIG. 3 includes a communication unit 334, multiple communication units 334 may be included. For example, multiple NICs may be included in the computing device 104.

In some instances, the communication unit 334 includes a cellular communications transceiver for sending and receiving data over a cellular communications network including via short messaging service (SMS), multimedia messaging service (MMS), hypertext transfer protocol (HTTP), direct data connection, wireless application protocol (WAP), e-mail or another suitable type of electronic communication. In some instances, the communication unit 334 includes a wired port and a wireless transceiver. The communication unit 334 also provides other conventional connections to the network 202 for distribution of files and/or media objects using standard network protocols including transmission control protocol/Internet Protocol (TCP/IP), hypertext transfer protocol (HTTP), HTTP secure (HTTPS), secure sockets layer (SSL), and simple mail transfer protocol (SMTP), etc.

The storage service 340 can include software including routines for storing and retrieving data to and from the distributed computing system 200. More particularly, the storage service 340 may program the processor 330 to coordinate storage and retrieval to and from storage devices on storage nodes 106 across one or more computing system racks 100. In some instances, the storage service 340 provides an object storage service with a storage API providing an interface to the object storage service. Details regarding such an implementation is discussed further with reference to FIG. 4 below.

In some instances, the storage service 340 receives from the communication unit 334 a request to store or retrieve a date item. For example, the communication unit 334 may receive an object identifier or key and request to retrieve the object associated with the identifier. The storage service 340 may then look up the identifier in the storage device 342 to determine a physical address for the object. The storage service 340 may then retrieve the object from the storage node 106 and return the object to the requesting entity.

The storage device 342 can be a non-transitory memory that stores data for providing the functionality described herein. The storage device 342 may be a dynamic random access memory (DRAM) device, a static random access memory (SRAM) device, flash memory, or some other memory devices. In some instances, the storage device 342 also includes a non-volatile memory or similar permanent storage device and media including a hard disk drive, a floppy disk drive, a CD-ROM device, a DVD-ROM device, a DVD-RAM device, a DVD RW device, a flash memory device, or some other mass storage device for storing information on a more permanent basis.

In the implementation shown in FIG. 3, the bring-up application 300 includes a network configuration generator 302, a network configuration applicator 304, a configuration file parser 306, a network configuration status checker 308, a web server 310, a system initializer 312, a user interface 314, and a controller 316. These components of the bring-up application 300 are communicatively coupled to each other via the bus 320.

The network configuration generator 302 may include software including routines for generating a network configuration. In some instances, the network configuration generator 302 can be a set of instructions executable by the processor 330 providing functionality described below for configuring network settings on nodes within one or more computing system racks 100. For example, the network configuration generator 302 may configure network settings for a distributed computing system 200. In some instances, the network configuration generator 302 can be stored in the memory 332 of the computing device 104 and can be accessible and executable by the processor 330. The network configuration generator 302 may be adapted for cooperation and communication with the processor 330 and other components of the computing device 104 via the bus 320. In some embodiments, the bring-up application 300 may include capabilities to configure other non-network settings.

In some instances, the network configuration generator 302 receives, from the controller 316, network configuration information for multiple nodes in a distributed computing system 200. The nodes may be distinguished by the site at which they are located. For example, some nodes may be located at the computing system rack 100*a*, while other nodes may be located at the computing system rack 100*b*, and so forth. With the received network configuration information, the network configuration generator may generate a system-wide network configuration file. The system-wide network configuration file may include network configuration information for the multiple nodes in the distributed computing system 200. Further, the multiple nodes may be grouped in the system-wide network configuration file by site location or computing system rack 100 in the distributed computing system 200.

For example, an identifier may be included in the system-wide network configuration file to identify a particular computing system rack 100*a*. In one example, a media access control (MAC) address may be stored in the generated system-wide network configuration file identifying one of the NICs in the controller node 104 as being associated with a particular computing system rack 100*a*. Moreover, the particular computing system rack 100*a* may include a name, such as "Palo Alto", in the system-wide network configuration file to assist human users in identifying the geographic location of the computing system rack 100*a*.

As another example, the system-wide network configuration file may include a different MAC address associated with the computing system rack 100*b*. Further, the system-wide network configuration file may also include the name "Seattle" for computing system rack 100*b*. Additionally, each computing system rack 100 set forth in the network configuration file may include identifiers for the nodes and devices in that computing system rack 100.

The network configuration generator 302 may generate (for the system-wide network configuration file) Layer-3 networking information, including for example, IP addresses, subnet masks, gateways, DNS servers, and networking services such as Dynamic Host Configuration Protocol (DHCP) and virtual private network (VPN) tunnels, etc. Public IP addresses may be assigned to certain nodes in a computing system rack 100. The network configuration generator 302 may include routing across sites and coordinate IP assignments across sites through generation of the system-wide network configuration file. Additionally, Layer-2 networking information, or other similar data, may be included for replication to a switch 102 and/or other nodes in the computing system rack 100. For instance, virtual local area network (VLAN) identifiers may be assigned to NICs in the computing system rack 100 and/or ports on the switch 102. Routers, if any, included in the computing system rack 100 may include routing information pertinent to nodes in the computing system rack 100 in the system-wide network configuration file.

The network configuration applicator 304 can be software including routines for receiving the system-wide network configuration file and identifying network configuration information. In particular, the network configuration applicator 304 may identify a first set of nodes in the system-wide network configuration file as being part of the computing system rack 100*a*. The network configuration applicator 304 may then update network configuration for the first set of nodes based on the identified network configuration information for the computing system rack 100*a*. For example, the network configuration applicator 304 may execute on a controller node 104 in the computing system rack 100*a*. This instantiation of the network configuration applicator 304 may parse the system-wide network configuration file by communicating with the configuration file parser 306 and identifying a MAC address associated with the controller node 104 in the computing system rack 100*a*. Further with the associated MAC address, the network configuration applicator 304 may identify the remaining network configuration information for the computing system rack 100*a*. That is, the network configuration applicator 304 may program the processor to determine which portions of the system-wide network configuration file are pertinent to the computing system rack 100*a* and which portions of the system-wide network configuration file are associated with other computing systems in the distributed computing system 200.

The network configuration applicator 304 may communicate with the web server 310 to receive a system-wide network configuration file uploaded to the bring-up application 300 from another node (e.g., computing device of a user) via the network 202. The network configuration applicator 304, as discussed above, may cooperate with the configuration file parser 306 to parse the information contained therein for the network configuration applicator 304. The network configuration applicator 304 may then update the network configuration for the first plurality of nodes with the parsed and identified network configuration information for the computing system rack 100*a*. This mechanism may be similarly employed on the other computing system racks 100 of the distributed computing system 200.

The configuration file parser 306 may include software having routines for parsing a system-wide network configuration file. In some instances, the configuration file parser 306 can be a set of instructions executable by the processor 330 to provide the functionality described below for parsing a system-wide network configuration file. In some instances, the configuration file parser 306 can be stored in the memory 332 of the computing device 104 and can be accessible and executable by the processor 330 and other components of the computing device 104 via the bus 320.

In some instances, the configuration file parser 306 receives (from the controller 316, the network configuration generator 302, the network configuration applicator 304, or another system 100 component) a request to parse a system-wide network configuration file. In a further example, the request may come from the network configuration applicator 304 through the controller 316, network configuration generator 302, the network configuration applicator 304, or another source. The configuration file parser 306 may open and/or receive the system-wide network configuration file and read the file into the memory 332. In some embodiments, the configuration file parser 306 may transform the system-wide network configuration file into a set of operating system shell commands to be executed by the network configuration applicator 304 to effectuate the network configuration update embodied in the system-wide network configuration file. Other variations are also possible and contemplated.

The network configuration status checker 308 may include software having routines for checking the status of nodes in the distributed computing system 200. In some instances, the network configuration status checker 308 can be set of instructions executable by the processor 330 to provide the functionality described below for checking status of nodes in the distributed computing system 200. In some other instances, the network configuration status checker 308 can be stored in the memory 332 of the computing device 104 and can be accessible and executable by the processor 330. The network configuration status checker 308 may be adapted for cooperation and communication with the processor 330 and other components of the computing device 104 via the bus 320.

In some instances, the network configuration status checker 308 receives, from the network configuration applicator 304, a request to determine whether the nodes in the distributed computing system 200 are network configured. The network configuration status checker 308 may, in some cases, receive the request via an intervening component, such as a controller, although, in further embodiments, may receive the request directly.

The network configuration status checker 308 may determine whether nodes in the computing system rack 100*a* and the nodes in the computing system rack 100*b* and/or 100*n* are properly network configured and communicatively accessible therebetween over the network 202. For example, the network configuration applicator 304 may configure a public IP address for a publicly accessible mode in the computing system rack 100*a*. An instantiation of the network configuration status checker 308 on a node in the computing system rack 100*b* may then poll connectivity status to the publicly accessible node periodically until connectivity is established with the publicly accessible node. The network configuration status checker 308 may then query the publicly accessible node on whether all of the nodes in the computing system rack 100a have been properly network configured. Thus, the network configuration status checker 308, as instantiated on a node in the computing system rack 100a, may iteratively poll each node in the computing system rack 100a to determine whether those nodes have been properly network configured. When a node has not been properly network configured, the network configuration applicator may execute instructions to effectuate network setting changes on the improperly network configured node.

The web server 310 may include software having routines for serving data to one or more client devices. The data, in some embodiments, may be renderable as graphical user interface(s). The user interface 314 may reside, at least in part, on a user device of the user and interpret and render code received from the web server 310. In some embodiments, the web server 310 may provide structured data, such as extensible markup language (XML), javascript object notation (JSON), table data, etc. In some instances, the web server 310 can be a set of instructions executable by the processor 330 to provide the functionality described below. In some other instances, the web server 310 can be stored in the memory 332 of the computing device 104 and can be accessible and executable by the processor 330 the web server 310 may be adapted for cooperation and communication with the processor 330 and other components of the computing device 104 via the bus 320.

In some instances, the web server 310 receives the request for a page from the user interface 314. The request may, in some cases, be received by a controller, such as a request handler, or other component. The web server 310 may retrieve code embodying the page from storage and/or generate it, execute any dynamic code embedded in the page, and transmit the page to the requesting entity (e.g., a user's web browser) via the communication unit 334. The code embodying the page may, in some cases, be written in a Web language such as HTML, JavaScript, JSON, cascading style sheets (CSS), etc., and may comprise more than one file. The web server 310 may provide other ancillary functionality including caching, authentication, etc.

The system initializer 312 may include software including routines for initializing a distributed computing system 200. In some instances, the system initializer 312 can be set of instructions executable by a processor 330 to provide the functionality described below for initializing the distributed computing system 200. In some other instances, the system initializer 312 can be stored in the memory 332 of the computing device 104 and can be accessible and executable by the processor 330. The system initializer 312 may be adapted for cooperation and communication with the processor 330 and other components of the computing device 104 via the bus 320.

In some instances, the system initializer 312 receives a request to initialize system parameters in the distributed computing system 200. The request may, in some cases, be received by a controller, such as a request handler, or another component. In some embodiments, once the various system parameters have been received by the system initializer 312, the system initializer 312 may apply the various system parameters and move the distributed computing system 200 from a network configured state 504 to initialized state 506.

The user interface 314 may include software including routines for generating graphical data for providing user interfaces to users. In some instances, the user interface 314 can be a set of instructions executable by the processor 330 to provide the functionality described below for generating graphical data for providing user interfaces. In some other instances, the user interface 314 can be stored in the memory 332 of the computing device 104 and can be accessible and executable by the processor 330. The user interface 314 may be adapted for cooperation and communication with the processor 330 and other components of the computing device 104 via the bus 320.

In some instances, the user interface 314 may exchange data with other system 200 components, such as the web server 310. In further embodiments, the user interface 314 may exchange (e.g., send, receive) data with the network configuration generator 302, the network configuration applicator 304, the system initializer 312, or other system component. Example data may include requests for configuring the distributed computing system 200, system configuration data, etc. In some implementations, the user interface 314 generates graphical data for presenting information, such as configuration data, to the user. Examples of user interfaces are shown in FIGS. 8-11.

The controller 316 may include software having routines for handling communications between the bring-up application 300 and other components of the computing device 104. In some instances, the controller 316 can be a set of instructions executable by the processor 330 to provide the functionality described below for handling communications between the bring-up application 300 and other components of the computing device 104. In some other instances, the controller 316 can be stored in the memory 332 of the computing device 104 and can be accessible and executable by the processor 330. The controller 316 may be adapted for cooperation and communication with the processor 330 and other components of the computing device 104 via the bus 320. In some instances, the controller 316 receives data from components of the bring-up application 300 and stores the data in the storage device 342. In some instances, the controller 316 manages communication between components of one or more systems 100 and/or 200, although in further embodiments the components of system 100 and/or 200 may communicate directly or via other intervening components.

Figure 4:
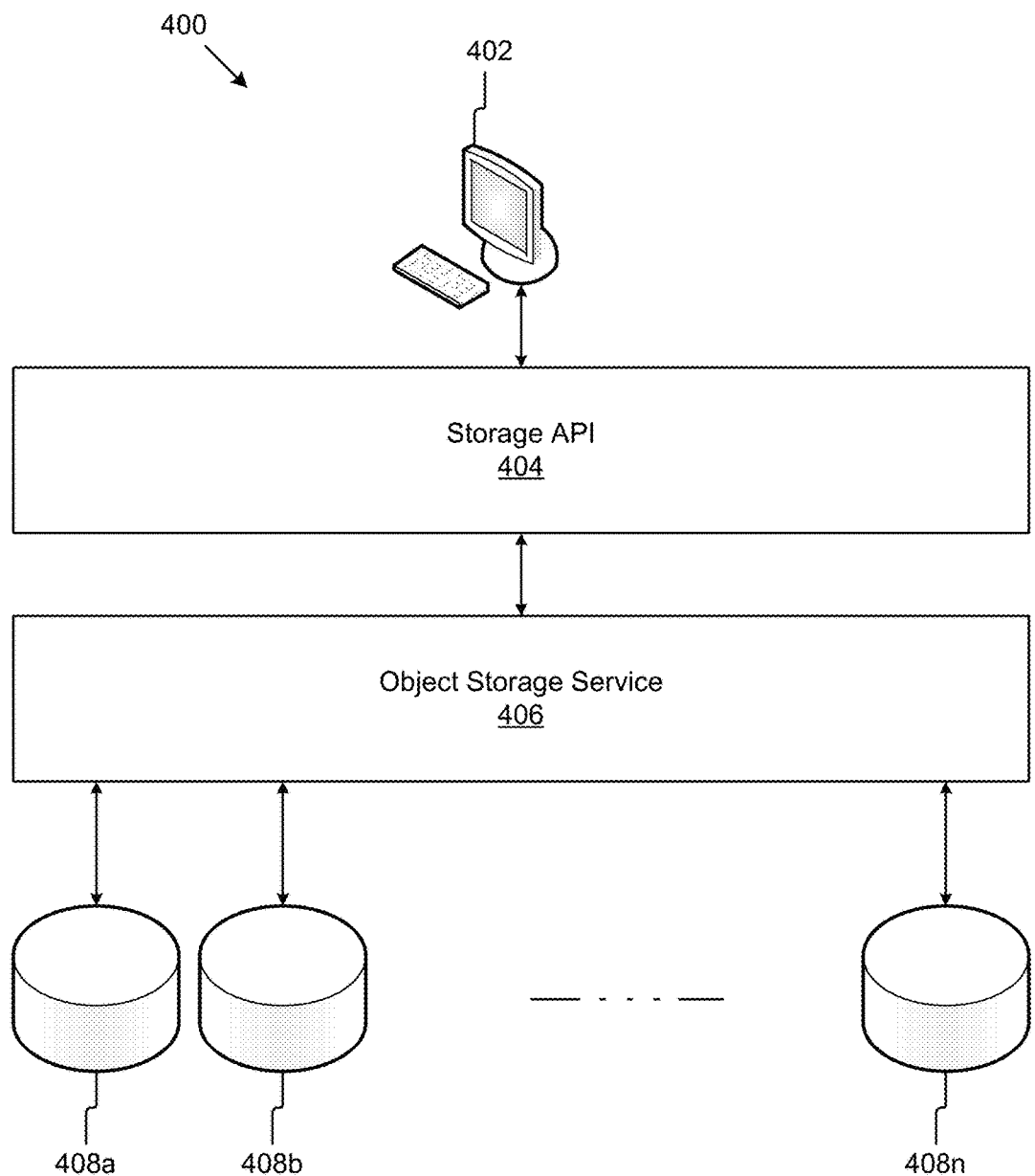
FIG. 4 is a block diagram of an example object storage system.

FIG. 4 is a block diagram of an example object storage system 400. As illustrated, the object storage system 400 may be accessed by a computer terminal 402 (e.g., via an instance of the user interface 314 and/or another application) through the object storage system's storage API 404. The object storage API 404 is communicatively connected to the object storage service 406 which in turn is connected to one or more storage devices 408a, 408b, 408n (e.g., 106a, 106b, 106n, etc.). The storage API 404 and the object storage service 406 may include software having routines for providing storage services. The web server 310 may, in some cases, expose access to the storage API 404. The storage API 404 and the object storage service 406 may be electronically communicatively coupled by a communication bus including a network such as a LAN or network 202 for cooperation and communication.

As discussed above, the distributed computing system 200 may form part of a distributed object storage service such as object storage system 400 illustrated in FIG. 4. The storage API 404 may be hosted on a gateway node 104 within one or more computing system racks 100. For example, the storage API 404 may form a portion of the storage service 340. Likewise, the object storage service 406 may also form a portion of the storage service 340. In some embodiments, the storage devices 408 may form part of one or more storage nodes 106. Moreover, a portion of the object storage service 406 may be hosted and executed on one or more of the storage nodes 106 and managed by a controller node 104 with the storage service 340 executing thereon.

Figure 5:
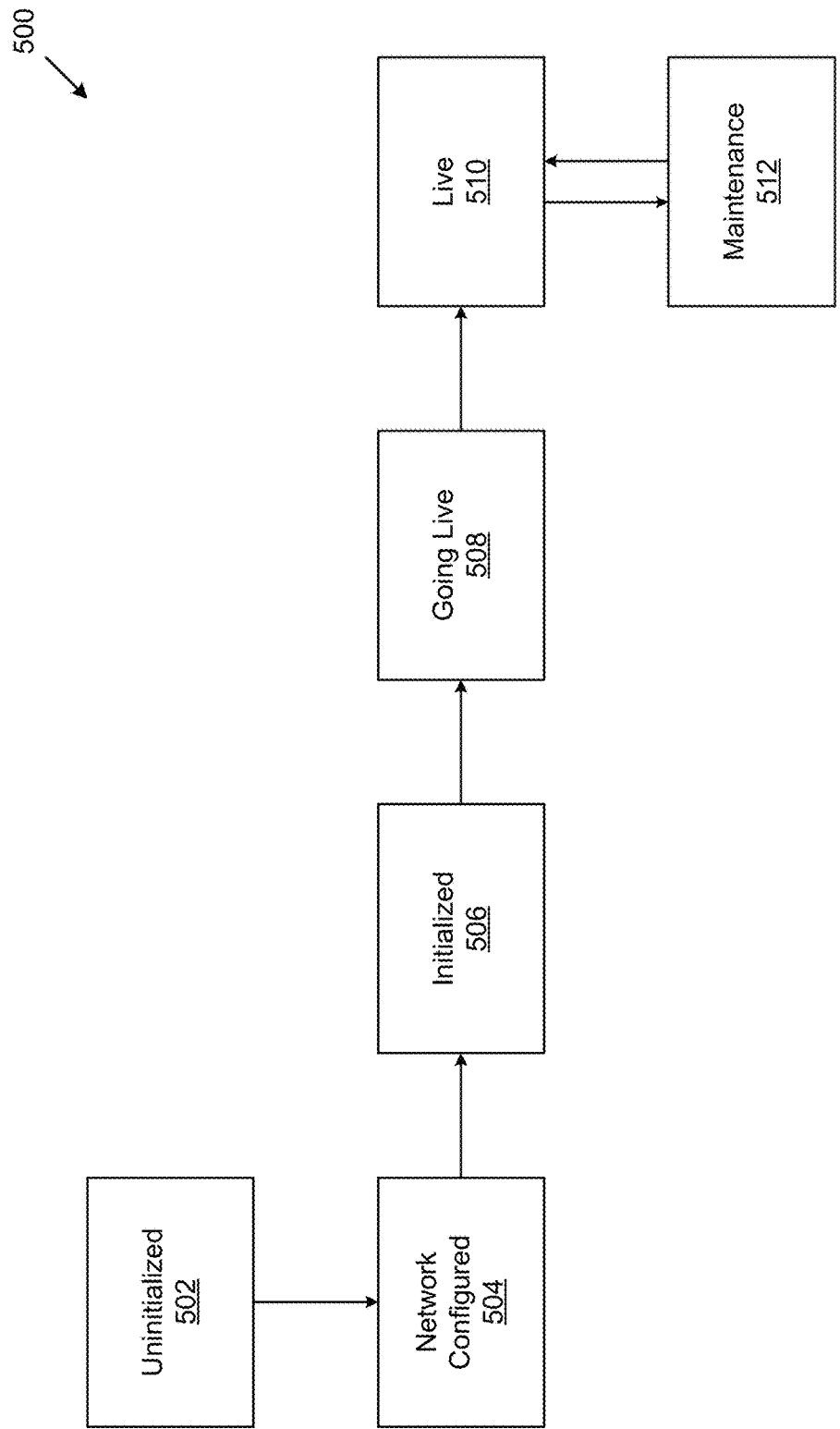
FIG. 5 is a state diagram of an example flow of a distributed computing system.

FIG. 5 is a state diagram of an example flow 500 of a distributed computing system 200. The distributed computing system 200 may at any given time be in one of several states. The distributed computing system 200 may be in an uninitialized state 502, network configured state 504, initialized state 506, going live state 508, live state 510, or maintenance state 512.

In some embodiments, the states can be grouped into pre-configuration states (namely uninitialized 502, network configured 504, and initialized 506) and lively states (namely going live 508, live 510, and maintenance 512). In pre-configuration, IP networking configuration may be performed for the nodes and devices in the distributed computing system 200. The uninitialized state 502 may in some cases be a factory state of the nodes in the distributed computing system 200.

For example, default IP addresses and networking configuration information may be set on the nodes of the distributed computing system 200 when built at the factory before shipping to the customer, and/or when first initialized by the consumer. Between the uninitialized state 502 and the network configured state 504, the bring-up application 300 described above with reference to FIG. 3 may, for example, be used to configure the network settings of the nodes of the distributed computing system 200. Specifically, the network configuration generator 302 and the network configuration applicator 304 may respectively generate the system-wide network configuration file for the distributed computing system 200 and apply the network configuration specified in the system-wide network configuration file to the nodes of the distributed computing system 200.

Between the network configured state 504 and the initialized state 506, additional initialization information may be gathered and applied to the distributed computing system 200. For example, the system initializer 312 may handle gathering this information from the user and apply the parameters specified by the user to the nodes of the distributed computing system 200. In some cases, parameters related to the storage service 340 may be communicated from the system initializer 312 to the storage service 340 for application thereon.

Responsive to the distributed computing system 200 being initialized, a user may request that the distributed computing system 200 go live by interacting with the user interface 314. The going live state 508 may be a transitional state where processes and servers on the nodes in the distributed computing system 200 are started. For example, the storage service 340 may start on the controller node 104, and similar services may begin execution on storage nodes 106.

The live state 510 may reflect that the distributed computing system 200 is operationally ready for user interaction by other network nodes. For example, the storage API 404 may be listening on specified ports and configured to respond to storage requests to the object storage service 406.

As depicted in FIG. 5, the maintenance state 512 may be a state that removes the distributed computing system 200 from the live state 510 and returns to the live state 510 upon completion of the maintenance state 512. Thus, operationally, the distributed computing system 200 may cease functioning while maintenance takes place on the system. For example, hardware components such as hard disk drives may be replaced and data copied from old hard disk drives onto new hard disk drives. As another example, parameters in the distributed computing system 200 may be reconfigured or repaired.

Figure 6:
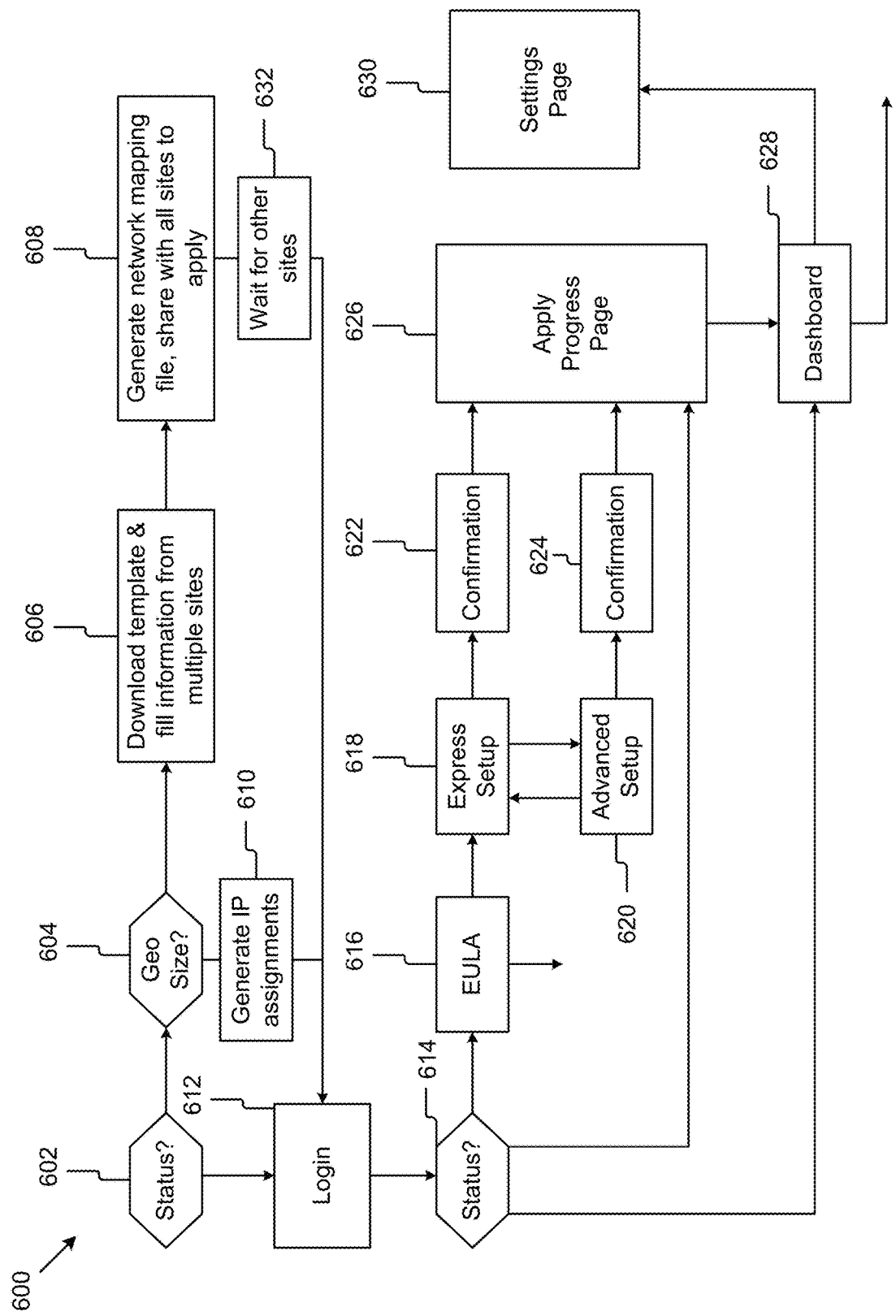
FIG. 6 is a flow chart of an example method for bringing a distributed computing system online.

FIG. 6 is a flow chart of an example method 600 of bringing a distributed computing system 200 online. The method 600 may begin by determining 602 the status of the system 200. If the system 200 is in an uninitialized state 502, the method 600 may continue to the block 604. If the system 200 is in a live state 510, an initialized state 506, or a network configured state 504, the method 600 may continue to the block 612. In block 604, the system 200 determines how many sites are in the system 200. For example, the system 200 may include three computing system racks 100a, 100b, and 100c located at various geographical sites. Alternatively, the system 200 may include a single computing system rack 100. If the system 200 includes only a single system 100, the method 600 may continue by generating 610 IP assignments and apply those IP assignments before continuing to the login page in block 612. If the system 200 includes more than a single computing system rack, such as three computing system racks 100a, 100b, and 100c, then the method 600 may continue by providing an option to download 606 a template for a system administrator to use to fill in information from the multiple sites. The system administrator may then upload the file to generate 608 network mappings and download a network mapping file to share with the other sites to apply. In block 632, the method 600 waits for the other sites to have the network mapping file applied and become communicatively connected with the local computing system rack 100. The method 600 may then continue to the login 612 by the web server 310 sending a page as part of the user interface 314 to the computing device. Otherwise, the method 600 may request that another IP mapping file be uploaded or alternatively may direct the user to a host-to-IP mapping generation page. For example, the user interface 314 may submit data to the web server 310 that provides input (e.g., file with IP mappings) to the network configuration generator 302.

In block 614, the network configuration status checker 308 may determine whether the system 200 is in a network configured state 504. The web server 310 along with the user interface 314 may proceed in preforming initialization steps 616, 618, 620, 622, and 624 by presenting pages through a computing device to a user as instructed by the system initializer 312. On the other hand, if the system 200 is in an initialized state 506, the system initializer 312 may skip to the apply progress page 626. If the system 200 is in a live state 510, then the system initializer 312 may skip to the dashboard page 628. Within the dashboard page 628, the user may enter a settings page 630 and modify the settings of the system. For example, parameters of the storage service 340 may be modified through the user interface 314 via the web server 310 and the network configuration applicator 304.

When the system 200 is in the network configured state 504, the method may direct the user to an end user license agreement (EULA) page 616 presented by the user interface 314 where the user can view the text of an agreement and accept or reject the terms of the licensing agreement. If the user rejects the EULA page 616, the method 600 may exit, or alternatively redirect the user to the initial status page 602. From block 616, the method may proceed to the express setup page 618 by the user interface 314 requesting the express setup page 618 from the web server 310. This express setup page 618 may have a limited number of editable parameters available to modify, but may provide a means to proceed through an advanced setup by clicking on a link. Thus, the method 600 may proceed in some cases to the advanced setup page 620 by the user interface 314 requesting the advanced setup page 620 from the web server 310. Similar to the link on the express setup page 618 that takes the user to the advanced setup page 620, on the advanced setup page 620, the user may click on a link to take him back to the express setup page 618. Upon the user clicking on the link to the express setup page, the user interface 314 requests the express setup page 618 from the web server 310. Regardless of whether the parameters are entered through the express setup 618 or the advanced setup 620, the method 600 proceeds to a respective confirmation page 622, 624 by the user interface 314 requesting the respective confirmation pages 622 and 624 from the web server 310. After the user confirms the parameters, the method 600 continues to the apply progress page 626 by the user interface 314 requesting the apply progress page 626 from the web server 310, where the parameters may be applied to the system (for example the computing system rack 100 by the network configuration applicator 304 and/or the system initializer 312).

Figure 7:
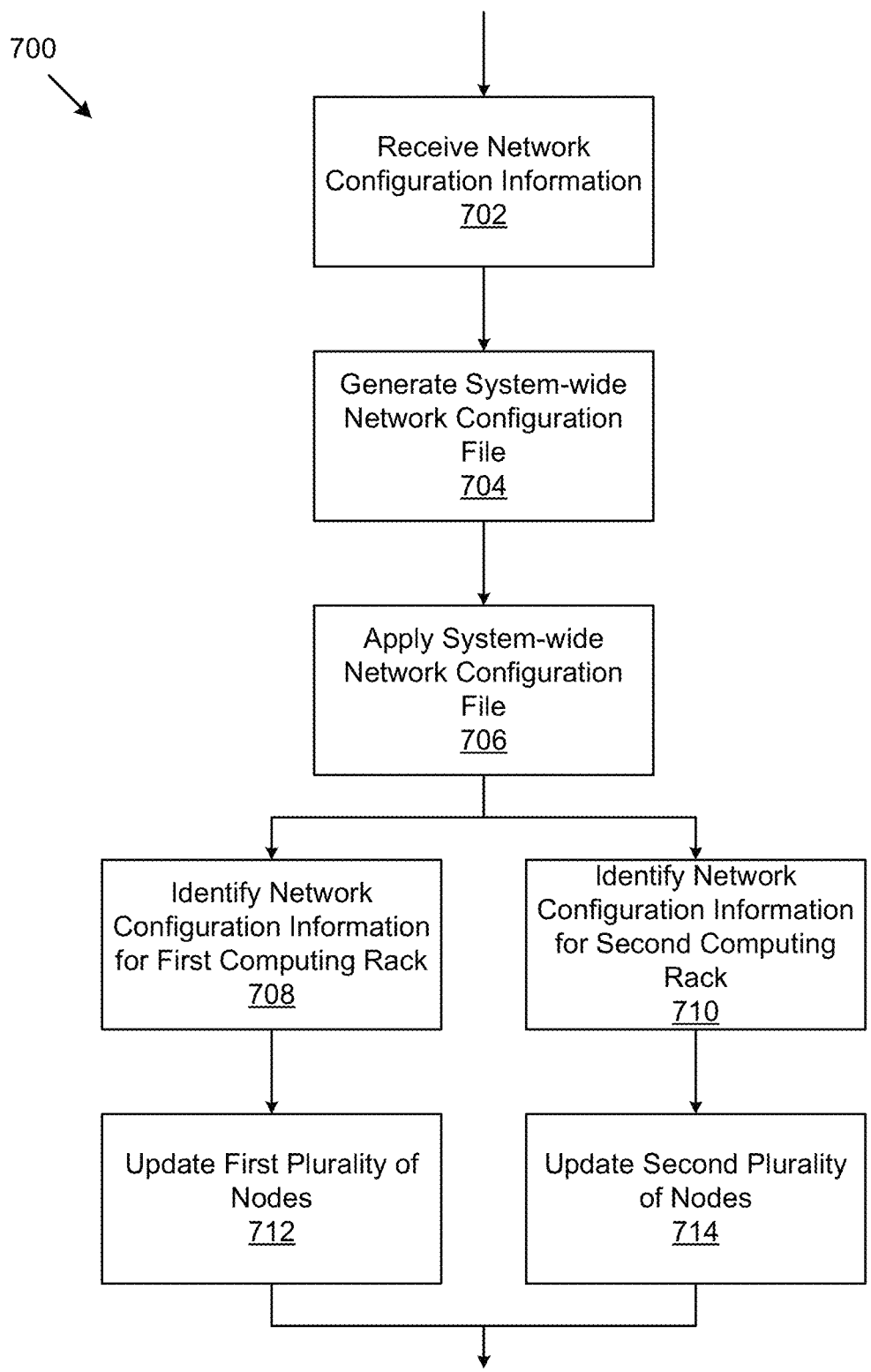
FIG. 7 is a flow chart of a further example method for bringing a distributed computing system online.

FIG. 7 is a flow chart of a further example method 700 for bringing a distributed computing system online. The method 700 may begin by receiving 702 network configuration information with the web server 310. This network configuration information may be received by the network configuration generator 302 through the web server 310 from the user interface 314. The method 700 may then to proceed to generate 704 a system-wide network configuration file based on the received network configuration information with the network configuration generator 302. A system administrator may take the generated system-wide network configuration file and upload the system-wide network configuration file to, for example, one or more controller nodes 104 by using the user interface 314 to submit the system-wide network configuration file to the web server 310. With the generated system-wide network configuration file uploaded, the controller node 104 may apply 706 the settings to all of the nodes at one or more of the sites. In instances where a site is a primary site, the method 700 may allow the system administrator to configure and apply 706 the settings within the user interface 314. Where a site is a non-primary site, the method 700 may including uploading the settings and applying 706 the system-wide network configuration file. In some instances, each controller node 104 may be within a separate computing system rack 100 within the distributed computing system 200. Thus, in block 708, the controller node 104 may identify 708 network configuration information for a first computing system rack, namely the computing system rack which the controller node 104 belongs to as contained in the system-wide network configuration file by using the configuration file parser 306. Similarly, in block 710, a separate controller node 104 may identify 710 network configuration information for a second computing system rack by using the configuration file parser 306. In blocks 712 and 714, the plurality of nodes respectively associated with each computing system rack may be updated. For example, the networking configuration may be updated on the nodes to match the information in the system-wide network configuration file by using the network configuration applicator 304.

Figure 8:
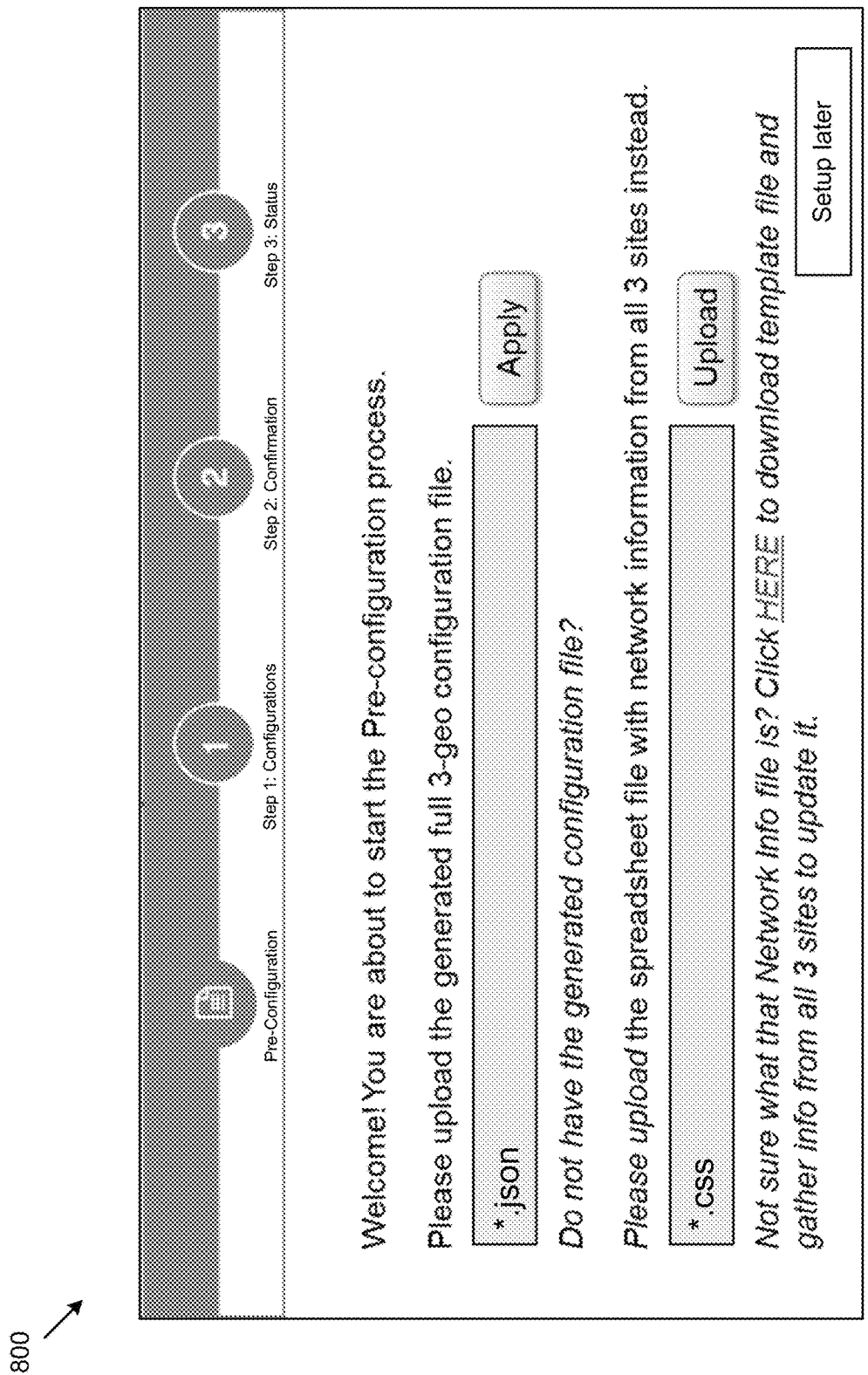
FIG. 8 is a schematic illustration of an example graphical user interface.

FIG. 8 is a schematic illustration of an example graphical user interface 800. In the user interface 800, a user is prompted to upload a system-wide network configuration file if it has already been generated, or to upload the network information file so that the system can start the configuration generation, or to obtain a template file for a system administrator to fill in network information for each site. For example, the web server 310 may provide code which the user interface 314 may render to present the graphical user interface 800. Through the user interface 800, the web server 310 may receive 702 network configuration information. For example the upload file box displayed in the user interface 800 provides a way to upload the network information file to the web server 310 for processing by the network configuration generator 302. The user interface 800 also provides a way to upload the generated 704 system-wide network configuration file to the web server 310 for processing by the configuration file parser 306 and/or network configuration applicator 304.

Figure 9:
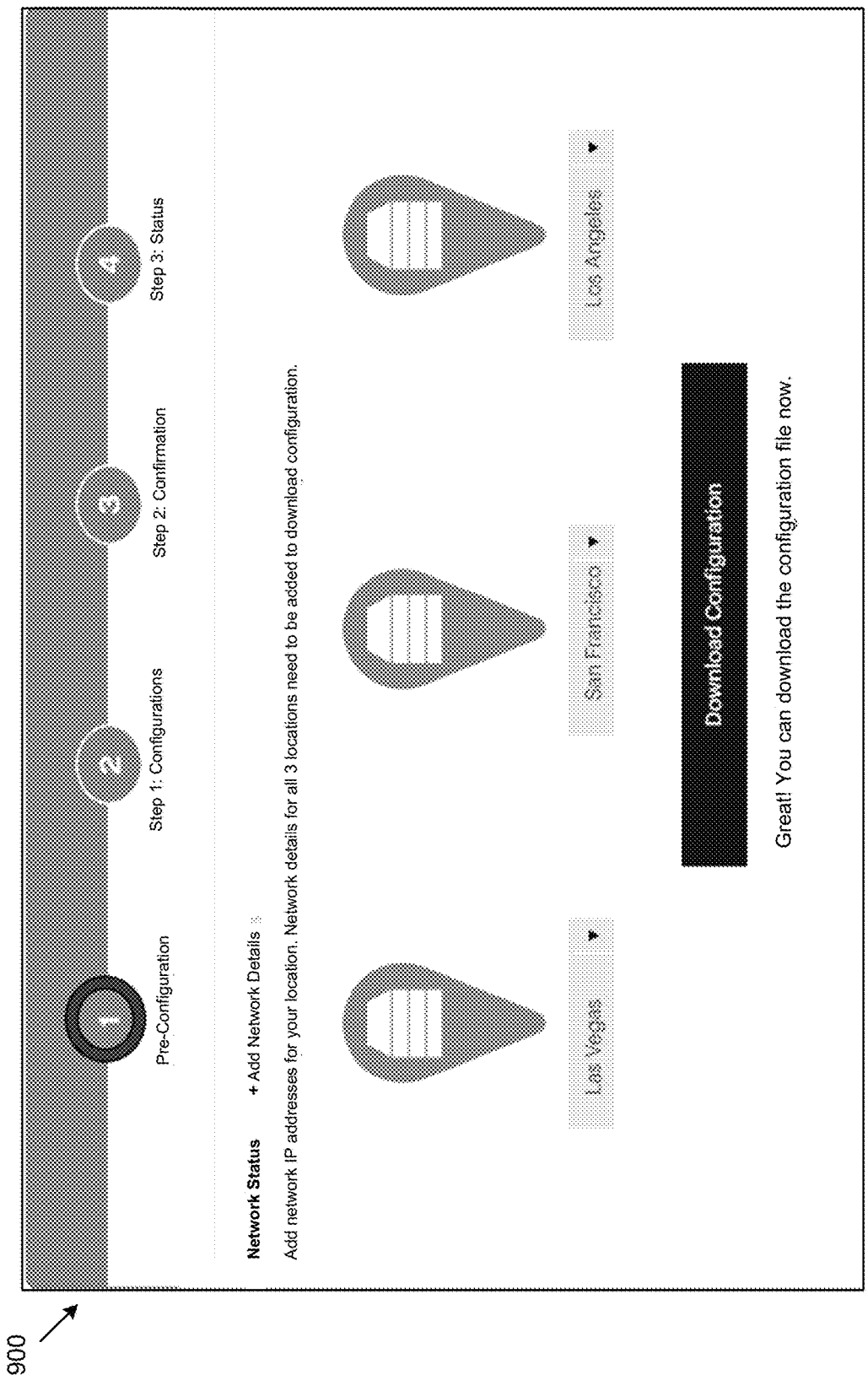
FIG. 9 is a schematic illustration of another example graphical user interface.

FIG. 9 is a schematic illustration of another example graphical user interface 900. In the user interface 900, the user has provided network configuration information for three sites in a distributed computing system 200, the system has generated a full system configuration, and now the user is prompted to download a system-wide network configuration file to apply 706 to the remote computer rack system 200 as prompted previously in FIG. 8's user interface 800. For example, the files downloaded may be used to identify 708, 710 network configuration information on respective systems 100, and update 712, 714 the nodes in the respective systems.

Figure 10:
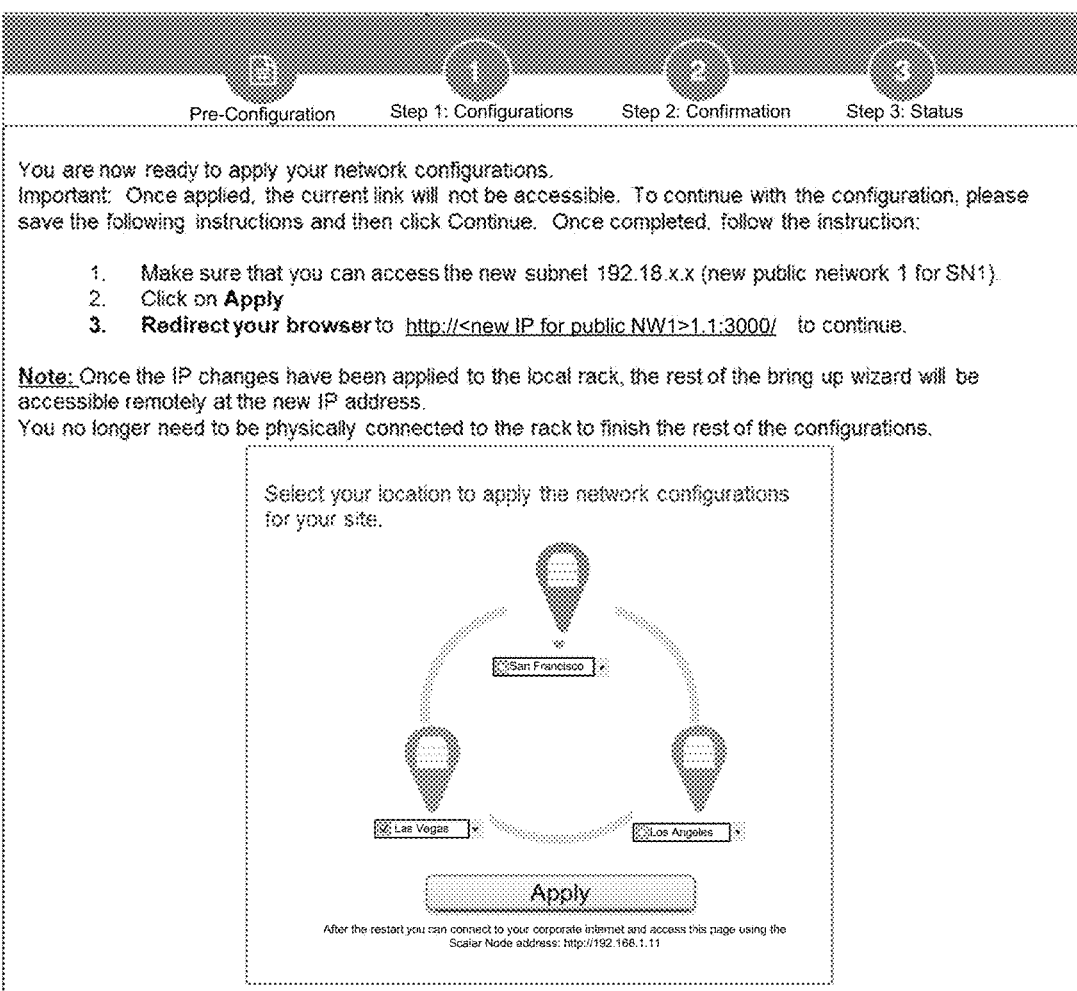
FIG. 10 is a schematic illustration of another example graphical user interface.

FIG. 10 is a schematic illustration of another example graphical user interface 1000. The user interface 1000 has automatically identified which location the local site maps to, so as to identify which portion of the system-wide network configuration needs to be applied to in the distributed computer rack system 200. In some instances, the user can select a site and re-modify the network configuration settings before applying the setting to the nodes in the computing system rack 100. Once the user selects the "Apply" button, the user interface 314 may communicate with the web server 310 which, in turn, may communicate with the network configuration applicator 304 to apply the network configuration.

In some embodiments, other graphical user interfaces may be employed to configure a system. For instance, a system consisting of a single computing system rack 100 may use a different graphical user interface where the configuration information is entered and applied directly to the computing system rack 100.

Figure 11:
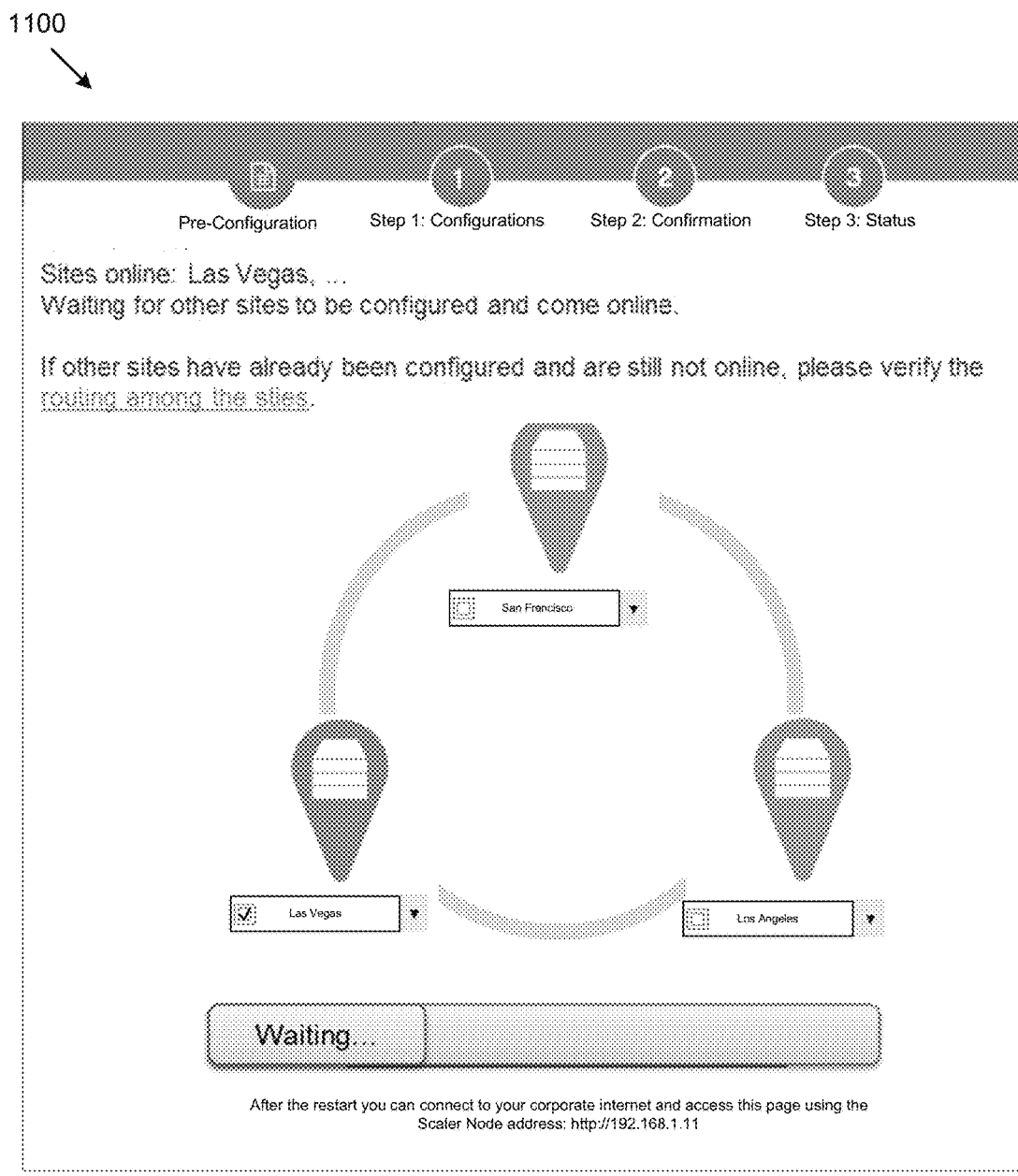
FIG. 11 is a schematic illustration of another example graphical user interface.

FIG. 11 is a schematic illustration of another example graphical user interface 1100. The user interface 1100 depicts the local site (Las Vegas) is waiting for the remaining sites, San Francisco and Los Angeles, to come online and be communicatively accessible to nodes from the Las Vegas site via the network 202. The user interface 314 may communicate with the web server 310 which may in turn communicate with the network configuration status checker 308 to provide the updated status on the user interface 314.

Systems and methods for implementing distributed computing configuration were described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to interfaces and particular hardware. Moreover, the technologies disclosed above primarily in the context of on line services; however, the disclosed technologies apply to other data sources and other data types (e.g., collections of other resources for example images, audio, web pages).

Reference in the specification to "one embodiment," "some embodiments" or "an embodiment" means that a particular feature, structure, or characteristic described in connection with the embodiment is included in at least one embodiment of the disclosed technologies. The appearances of the phrase "in one embodiment" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A system comprising:
a first computing system rack of a first plurality of nodes communicatively connected together, the first plurality of nodes including a first controller node configured to:
receive a first system-wide network configuration file, the first system-wide network configuration file useable to configure a plurality of computing system racks, including the first computing system rack and a second computing system rack, to form a distributed computing system;
identify the first plurality of nodes, using the first system-wide network configuration file, as part of the first computing system rack, wherein the first system-wide network configuration file includes an identifier for each node in the first plurality of nodes and an identifier for the first computing system rack;
determine a portion of the first system-wide network configuration file pertinent to the first computing system rack, and update a network configuration for the first plurality of nodes based on the portion of the first system-wide network configuration file determined to be pertinent to the first computing system rack; and
the second computing system rack of a second plurality of nodes communicatively connected together, the second plurality of nodes including a second controller node configured to:
receive the first system-wide network configuration file, identify the second plurality of nodes, using the first system-wide network configuration file, as part of the second computing system rack, wherein the first system-wide network configuration file includes an identifier for each node in the second plurality of nodes and an identifier for the second computing system rack;
determine a portion of the first system-wide network configuration file pertinent to the second computing system rack;
update a network configuration for the second plurality of nodes based on the portion of the first system-wide network configuration file determined to be pertinent to the second computing system rack; and
provide the distributed computing system comprising the first plurality of nodes as part of the first computing system rack and the second plurality of nodes as part of the second computing system rack to be communicably accessible using the updated network configurations.

2. The system of claim 1, wherein the first plurality of nodes and the second plurality of nodes are linked to an intermediate network, and wherein the first controller node is further configured to:
determine whether the second computing system rack has been properly network configured and is communicatively accessible over the intermediate network, and
provide a distributed computing system comprising the first plurality of nodes and the second plurality of nodes as being network configured based on the determination that the second computing system rack has been properly network configured and is communicatively accessible over the intermediate network.

3. The system of claim 2, wherein:
updating network configuration for the second plurality of nodes includes configuring a public network address for a publically accessible node of the second plurality of nodes using the first system-wide network configuration file: and
determining whether the second computing system rack has been properly network configured includes polling connectivity status to the publically accessible node periodically until connectivity is established, and querying the publically accessible node regarding whether the second plurality of nodes have been properly network configured.

4. The system of claim 1, further comprising a network configuration generator configured to:
receive network configuration information from the first plurality of nodes and the second plurality of nodes; and generate the first system-wide network configuration file including network configuration information for the first plurality of nodes and the second plurality of nodes.

5. The system of claim 4, wherein the network configuration generator is a browser-accessible application served from the first controller node.

6. The system of claim 1, wherein the first system-wide network configuration file comprises network configuration information for the first plurality of nodes and the second plurality of nodes.

7. The system of claim 1, wherein the first system-wide network configuration file comprises intelligent platform management interface addresses for the first plurality of nodes and the second plurality of nodes.

8. The system of claim 1, wherein the first controller node is further configured to:
authenticate a computing device to the system;
receive confirmation of acceptance of a license agreement from the computing device;
receive a set of distributed object storage configuration information for a distributed object storage service from the computing device;
apply the set of distributed object storage configuration information to the first plurality of nodes and the second plurality of nodes; and
activate use of the distributed object storage service by other computing devices on a connected network by enabling accessibility of the first controller node and the second controller node.

9. A computer-implemented method comprising:
uploading a first system-wide network configuration file to a first controller node and
a second controller node, the first system-wide network configuration file useable to configure a plurality of computing system racks, including a first computing system rack and a second computing system rack, to form a distributed computing system, wherein a first plurality of nodes is communicatively connected together in the first computing system rack, a second plurality of nodes is communicatively connected together in the second computing system rack, the first plurality of nodes includes the first controller node, and the second plurality of nodes includes the second controller node;
identifying the first plurality of nodes, using the first system-wide network configuration file, as part of the first computing system rack, wherein the first system-wide network configuration file includes an identifier for each node in the first plurality of nodes and an identifier for the first computing system rack;
determining a portion of the first system-wide network configuration file pertinent to the first computing system rack;
updating a network configuration for the first plurality of nodes based on the portion of the first system-wide network configuration file determined to be pertinent to the first computing system rack;
identifying the second plurality of nodes, using the first system-wide network configuration file, as part of the second computing system rack, wherein the first system-wide network configuration file includes an identifier for each node in the second plurality of nodes and an identifier for the second computing system rack;
determining a portion of the first system-wide network configuration file pertinent to the second computing system rack;

updating a network configuration for the second plurality of nodes based on the portion of the first system-wide network configuration file determined to be pertinent to the second computing system rack; and providing the distributed computing system comprising the first plurality of nodes as part of the first computing system rack and the second plurality of nodes as part of the second computing system rack to be communicably accessible using the updated network configurations.

10. The computer-implemented method of claim 9, wherein the first plurality of nodes and the second plurality of nodes are linked to an intermediate network, and wherein the method further comprises:

determining whether the second computing system rack has been properly network configured and is communicatively accessible over the intermediate network; and providing a distributed computing system comprising the first plurality of nodes and the second plurality of nodes as being network configured based on the determination that the second computing system rack has been properly network configured and is communicatively accessible over the intermediate network.

11. The computer-implemented method of claim 10, wherein:

updating network configuration for the second plurality of nodes includes configuring a public network address for a publically accessible node of the second plurality of nodes using the first system-wide network configuration file; and determining whether the second computing system rack has been properly network configured includes polling connectivity status to the publically accessible node periodically until connectivity is established, and querying the publically accessible node regarding whether the second plurality of nodes have been properly network configured.

12. The computer-implemented method of claim 9, further comprising:

receiving network configuration information for the first plurality of nodes and the second plurality of nodes; and generating the first system-wide network configuration file including network configuration information for the first plurality of nodes and the second plurality of nodes.

13. The computer-implemented method of claim 12, wherein receiving network configuration information and generating the first system-wide network configuration file is performed through a browser-accessible application served from the first controller node.

14. The computer-implemented method of claim 9, wherein the first system-wide network configuration file comprises network configuration information for the first plurality of nodes and the second plurality of nodes.

15. The computer-implemented method of claim 9, wherein the first system-wide network configuration file comprises intelligent platform management interface addresses for the first plurality of nodes and the second plurality of nodes.

16. The computer-implemented method of claim 9, further comprising: authenticating a computing device to the system;

receiving confirmation of acceptance of a license agreement from the computing device;

receiving a set of distributed object storage configuration information for a distributed object storage service from the computing device;

applying the set of distributed object storage configuration information to the first plurality of nodes and the second plurality of nodes; and activating use of the distributed object storage service by other computing devices on a connected network by enabling accessibility of the first controller node and the second controller node.

17. A system comprising:

means for uploading a first system-wide network configuration file to a first controller node and a second controller node, the first system-wide network configuration file useable to configure a plurality of computing system racks including a first computing system rack and a second computing system rack, to form a distributed computing system, wherein a first plurality of nodes is communicatively connected together in the first computing system rack, a second plurality of nodes is communicatively connected together in the second computing system rack, the first plurality of nodes includes the first controller node, and the second plurality of nodes includes the second controller node;

means for identifying the first plurality of nodes, using the first system-wide network configuration file, as part of the first computing system rack, wherein the first system-wide network configuration file includes an identifier for each node in the first plurality of nodes and an identifier for the first computing system rack;

means for updating a network configuration for the first plurality of nodes based on a portion of the first system-wide network configuration file determined to be pertinent to the first computing system rack;

means for identifying the second plurality of nodes, using the first system-wide network configuration file, as part of the second computing system rack, wherein the first system-wide network configuration file includes an identifier for each node in the second plurality of nodes and an identifier for the second computing system rack;

means for updating a network configuration for the second plurality of nodes based on a portion of the first system-wide network configuration file determined to be pertinent to the second computing system rack; and means for providing the distributed computing system comprising the first plurality of nodes as part of the first computing system rack and the second plurality of nodes as part of the second computing system rack to be communicably accessible using the updated network configurations.

18. The system of claim 17, wherein the first plurality of nodes and the second plurality of nodes are linked to an intermediate network, further comprising:

means for determining whether a second computing system rack has been properly network configured and is communicatively accessible over the intermediate network; and means for providing a distributed computing system comprising the first plurality of nodes and the second plurality of nodes as being network configured based on the determination that the second computing system rack has been properly network configured and is communicatively accessible over the intermediate network.

19. The system of claim 18, wherein:

the means for updating network configuration for the second plurality of nodes is configured to configure a public network address for a publicly accessible node of the second plurality of nodes using the first system-wide network configuration file; and the means for determining whether the second computing system rack has been properly network configured is configured to poll connectivity status to the publically accessible node periodically until connectivity is established, and querying the publically accessible node regarding whether the second plurality of nodes have been properly network configured.

20. The system of claim 17, further comprising:

means for receiving network configuration information for the first plurality of nodes and the second plurality of nodes; and means for generating the first system-wide network configuration file including network configuration information for the first plurality of nodes and the second plurality of nodes.

\* \* \* \* \*